(12) United States Patent
Hisatake

(10) Patent No.: US 7,082,603 B2
(45) Date of Patent: Jul. 25, 2006

(54) UPGRADING PERIPHERAL DEVICES

(75) Inventor: Derrick I. Hisatake, Sandy, UT (US)

(73) Assignee: Intel Corporation, Santa Clara, CA (US)

( * ) Notice: Subject to any disclaimer, the term of this patent is extended or adjusted under 35 U.S.C. 154(b) by 582 days.

(21) Appl. No.: 09/754,093

(22) Filed: Jan. 3, 2001

(65) Prior Publication Data

US 2002/0087960 A1  Jul. 4, 2002

(51) Int. Cl.
G06F 9/44   (2006.01)

(52) U.S. Cl. ...................................................... 717/173

(58) Field of Classification Search ........ 717/168–178; 713/100; 714/776, 276; 710/62; 709/219; 711/103
See application file for complete search history.

(56) References Cited

U.S. PATENT DOCUMENTS 5,504,801 A * 4/1996 Moser et al. ............ 379/29.01
5,659,801 A * 8/1997 Kopsaftis ...................... 710/62
5,815,722 A * 9/1998 Kalwitz et al. .............. 717/178
5,878,256 A * 3/1999 Bealkowski et al. ........... 713/2
6,055,632 A * 4/2000 Deegan et al. .............. 713/100
6,070,012 A * 5/2000 Eitner et al. ................. 717/168
6,327,617 B1 * 12/2001 Fawcett ....................... 709/219
6,467,088 B1 * 10/2002 alSafadi et al. ............. 717/173
6,594,723 B1 * 7/2003 Chapman et al. ........... 711/103
6,601,212 B1 * 7/2003 Guha et al. ................. 714/776
6,622,246 B1 * 9/2003 Biondi ........................ 713/100
6,880,075 B1 * 4/2005 Fukano et al. ................. 713/1
6,904,592 B1 * 6/2005 Johnson ....................... 717/168

* cited by examiner

Primary Examiner—Kakali Chaki
Assistant Examiner—Trenton J. Roche
(74) Attorney, Agent, or Firm—Fish & Richardson P.C.

(57) ABSTRACT

Upgrading a peripheral device in a network device includes sending an upgrade package to the network device over a computer network and automatically upgrading the internal software of the peripheral device using the upgrade package.

27 Claims, 5 Drawing Sheets

UPGRADING PERIPHERAL DEVICES

BACKGROUND

This invention relates to upgrading peripheral devices.

Peripheral devices provide input, output or other auxiliary functions to other devices in a computer system. Often the peripheral devices are embedded within network devices that lack a built-in user interface.

One method of upgrading such peripheral devices includes rebooting the network device into a specialized mode and using a special connector, such as a null modem cable, to connect the network device to a personal computer or other device that has a user interface. Using an application specific to the latter device's operating system, a user can upgrade the peripheral device.

SUMMARY

The disclosure relates to software upgrades of a peripheral device using an update package. For example, according to one aspect, a method includes sending an upgrade package over a computer network, receiving the upgrade package in a network device, and automatically upgrading internal software of a peripheral device installed in the network device using the upgrade package.

A system may include a computer network, a network device coupled to the network, and a peripheral device installed with the network device wherein the network device includes a processor configured to receive an upgrade package over the network and automatically upgrade the peripheral device using the upgrade package.

Additional features and various advantages will be readily apparent from the following description, the accompanying drawings and the claims.

DETAILED DESCRIPTION

Figure 1:
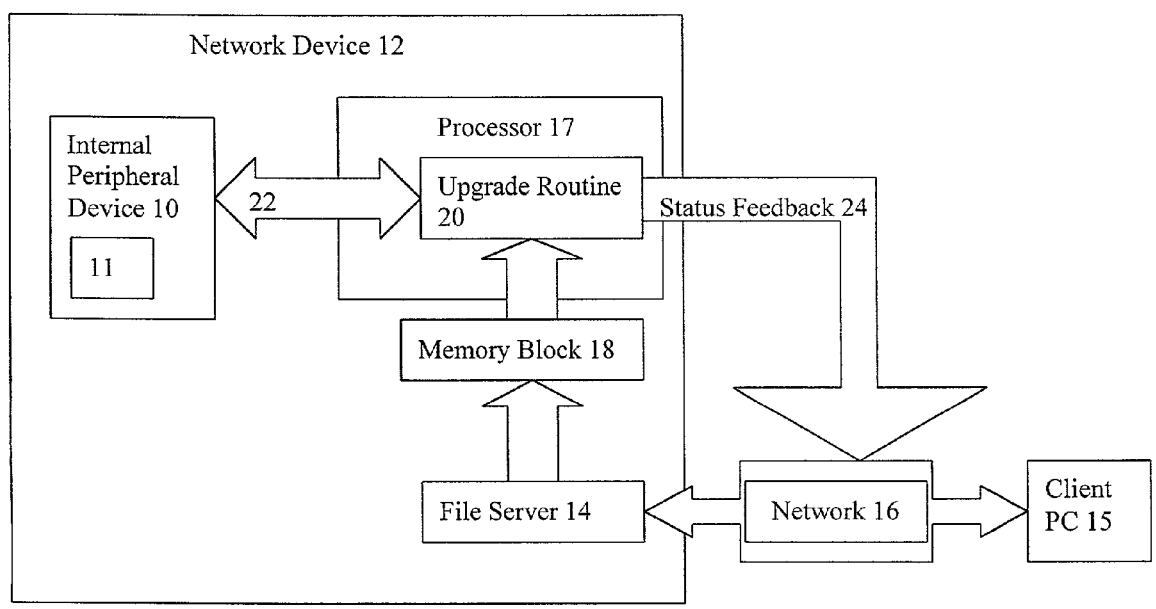
FIG. 1 shows a computer system.

As shown in FIG. 1, a network device 12 is coupled to a network 16 through which it can communicate with a client device such as a personal computer (PC) 15 connected to the network. The devices 12, 15 communicate by sending and receiving packages to and from one another. The packages can contain data, executable files, or a combination of both. A file transfer server 14 within the network device 12 helps manage the communications by storing the packages sent by the device 15. A processor 17 executes the functions that appropriately utilize the contents of the packages.

An internal peripheral device 10 is located within the network device 12. Software 11 used by the peripheral device 10 to perform its own functions is stored within the peripheral device. The software 11, which may include firmware, can be stored, for example, as read-only memory (ROM).

Figure 2:
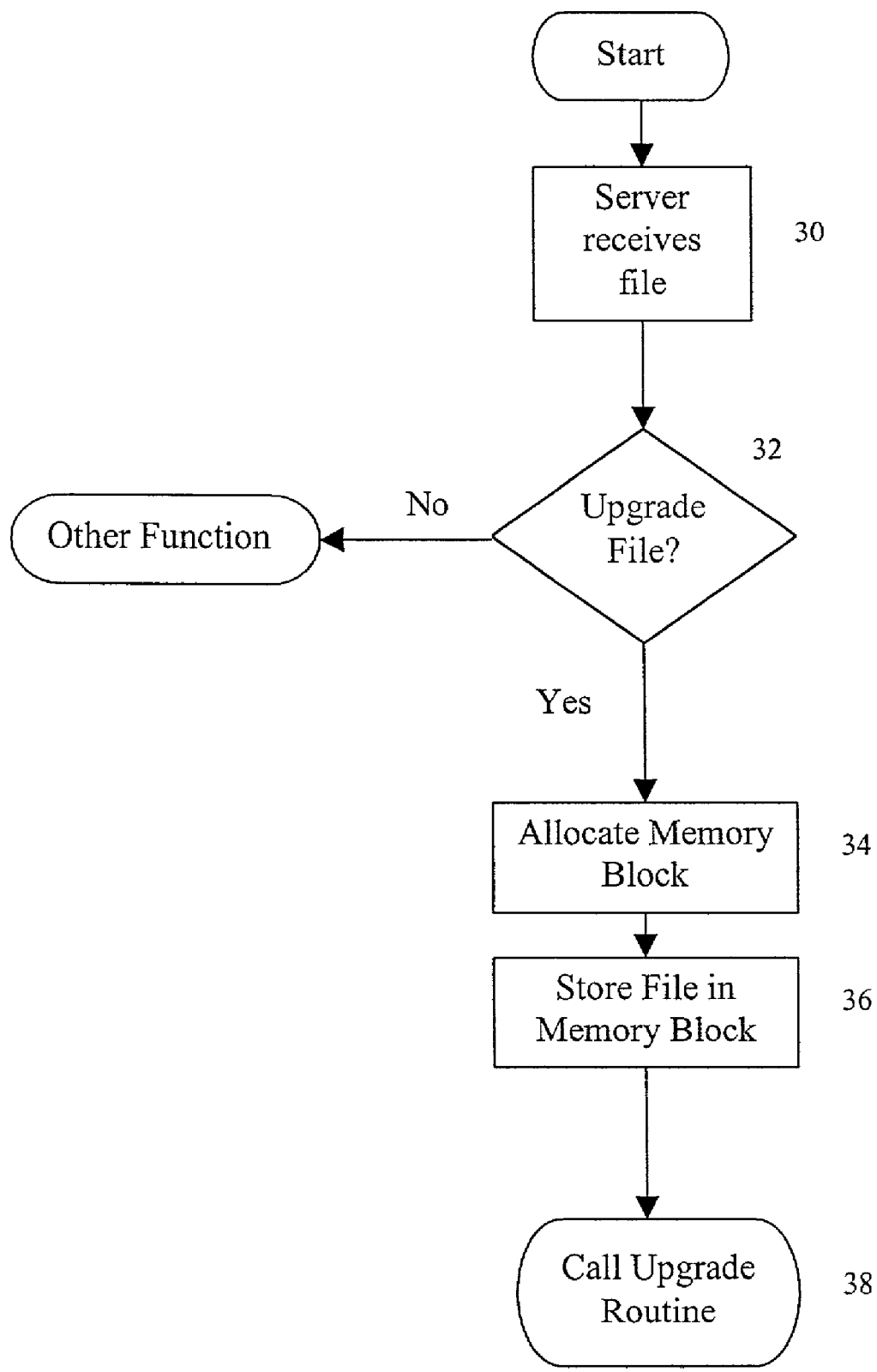
FIG. 2 is a flow chart.

As illustrated by FIG. 2, upon receiving 30 a package from the device 15 over the network 16, the file transfer server 14 determines 32 what type of package it is. For example, packages can include a key string, such as a filename extension, that indicates what the package's contents are and the appropriate functions needed to employ them. The server 14 examines the package's identifying key string to determine the package type. If the package is identified as a peripheral device upgrade, the server 14 allocates 34 a memory block 18 and stores 36 the contents of the package in the block. The server 14 then calls 38 a corresponding routine 20 that upgrades the peripheral 10 device with the package.

Figure 3:
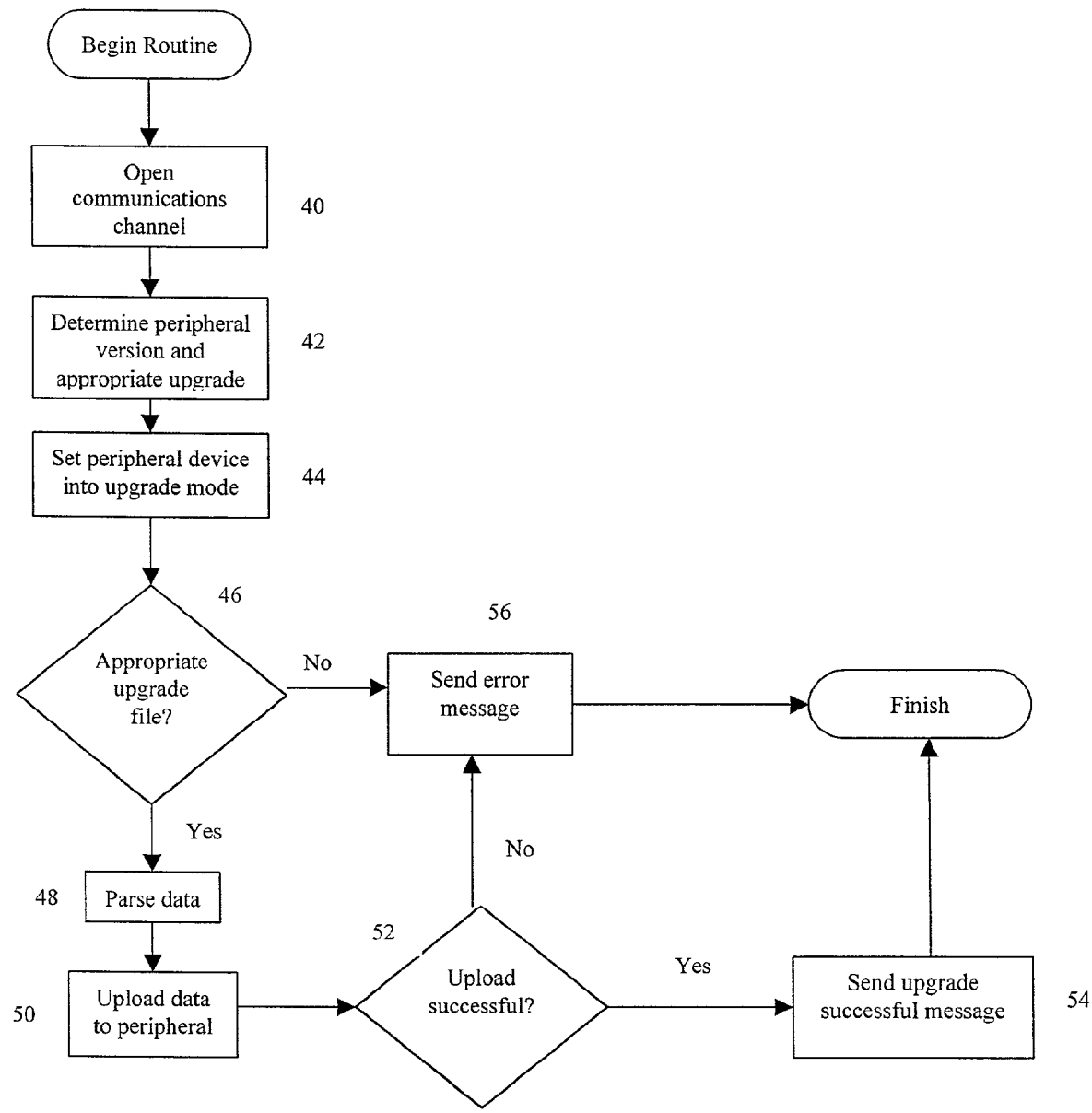
FIG. 3 is a flow chart.

As illustrated by FIG. 3 the upgrade routine 20 initially causes a communications channel 22 to be opened 40 between the processor 17 and the peripheral device 10. The communications channel can be, for example, a serial connection or a parallel connection. Next, the routine 18 identifies 42 the type and version of peripheral device 10 and its upgrade process using the connection 22. The peripheral device 10 is set 44 to a mode in which its internal software can be upgraded. Setting the peripheral device 10 to the upgrade mode may be accomplished, for example, by sending a command to the device 10, or by other techniques described below.

The routine 18 verifies 46 that the upgrade file in the stored package is the correct type for the peripheral device 10, and then parses the package 48 into a format suitable for transfer to the peripheral device 10. The parsed file is uploaded 50 to the peripheral device 10 over the communications channel 22. After the file is uploaded, a determination is made 52 as to whether the upgrade was completed successfully. If the upgrade was successful, a message reflecting the successful upgrade is sent 54 to the remote device 15. If the upgrade was not successful, for example, if an error fatal to the upgrade procedure occurs during the process, an error message is sent 56 to the remote device 15.

Figure 4:
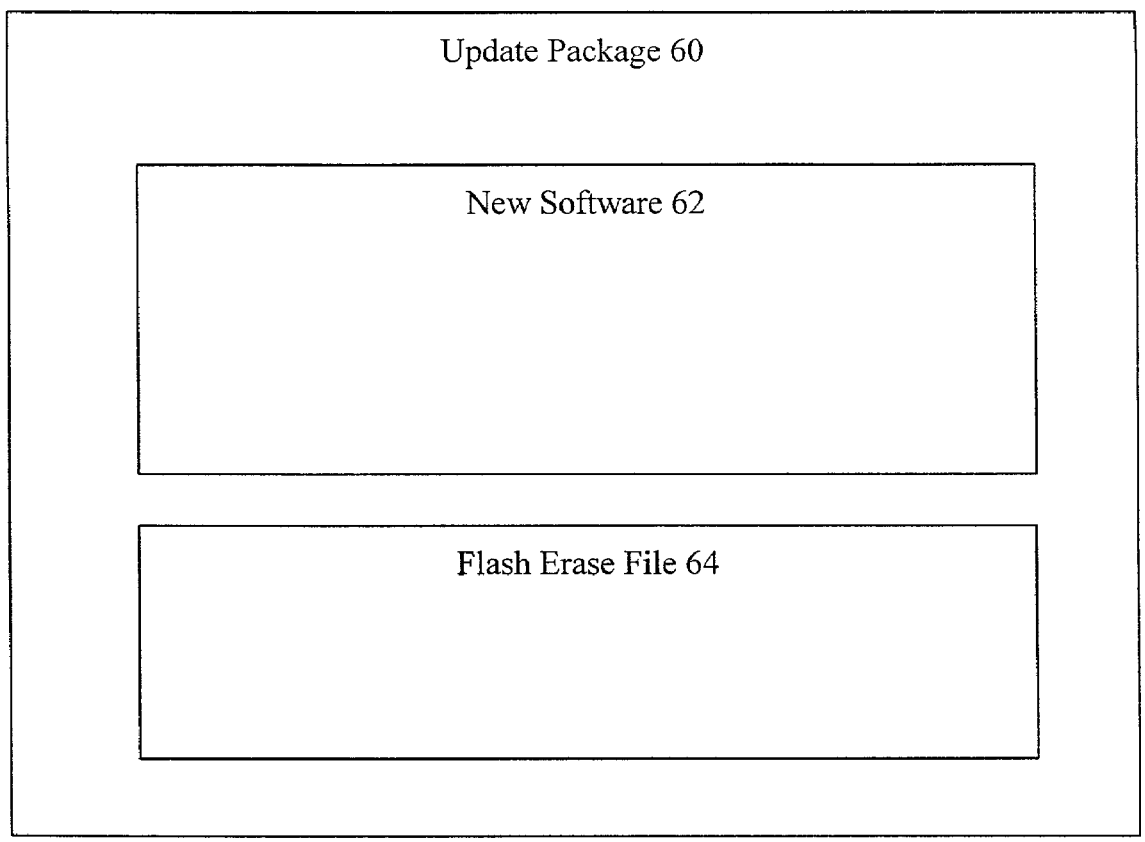
FIG. 4 shows an update package.

FIG. 4 shows an exemplary upgrade package 60 for upgrading the peripheral device 10. The package 60 contains software 62 that is intended to replace the peripheral device's 10 old software 11. The package 60 also contains a flash erase file 64 that is used to erase the old software in the peripheral device 10, thus setting the peripheral device 10 to a mode in which the new software 62 can be implemented. The flash erase file 64 can contain all zeros or equivalent null data content used to erase the specified memory location in the peripheral device 10.

Figure 5:
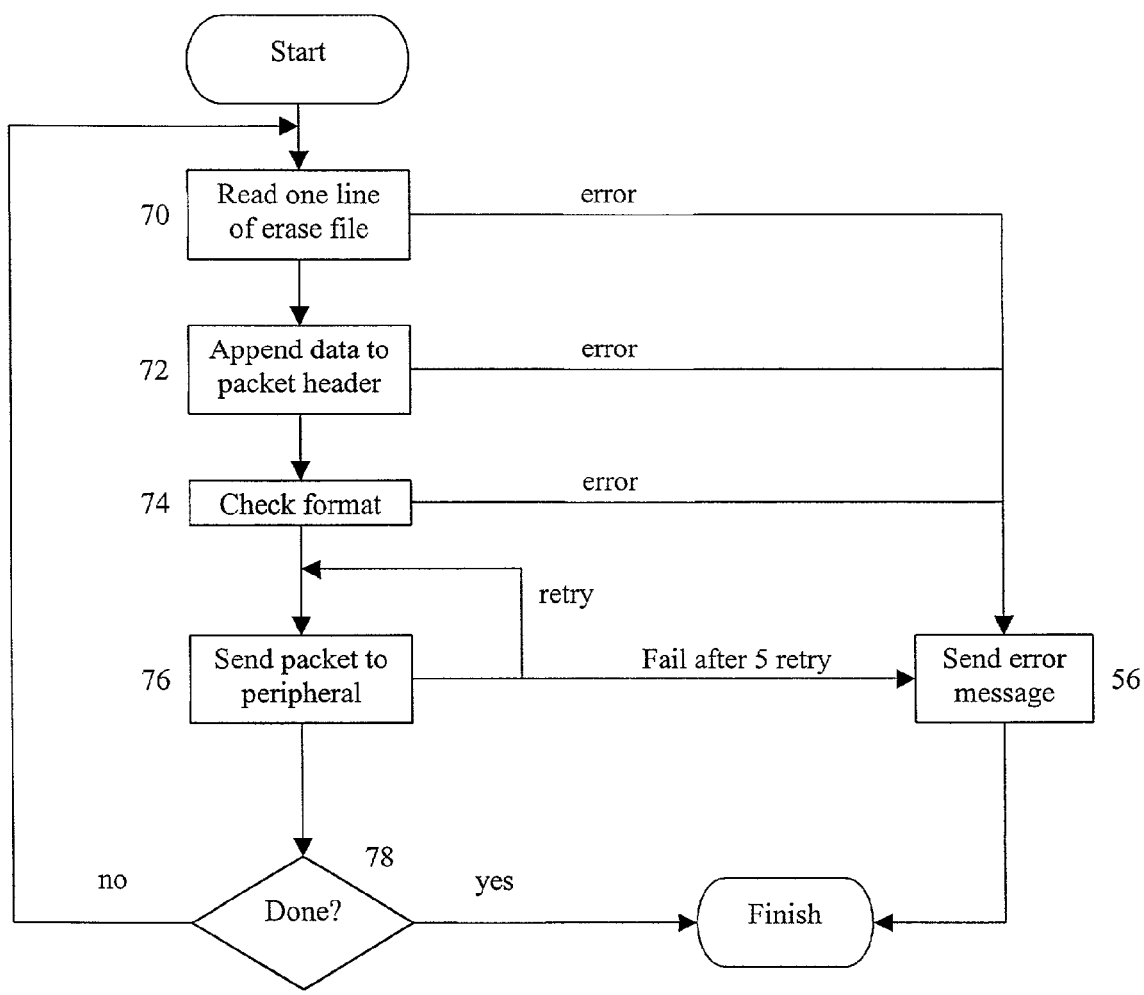
FIG. 5 is a flow chart.

FIG. 5 illustrates how the flash erase file 64 can be used to set the peripheral device 10 to the upgrade mode. In this particular implementation, the connection 22 to the peripheral device 10 carries serial data. One line of the flash erase file 64 is read 70 from the memory 18, appended 72 to a packet header and checked 74 to confirm that it is in a valid format. The packet header contains instructions for the peripheral device 10 to overwrite the contents of its software 11 with the contents of the packet. The packet then is sent 76 to the peripheral device 10 over the connection 22. The upgrade routine 20 checks 78 if the flash erase file's 64 transfer is complete, and repeats blocks 70, 72, 74 and 76 until the entire new file is downloaded to the peripheral device 10. If necessary, block 76 can be repeated a predetermined number of times before an error message is sent 56 to the remote device 56.

The automatic upgrade technique described above can be implemented, for example, in network devices such as the Intel® InBusiness™ Internet Station 56K as well as other devices coupled to a computer network. The process can be used to upgrade embedded peripheral devices such as onboard modems or other devices installed inside the network device. The file server 14 can use, for example, File Transfer Protocol ("FTP") to send and receive packages over the network 16. Other transfer methods, such as HyperText Transfer Protocol (HTTP), also may be used.

Advantages of these techniques may include the ability for upgrades to be made to embedded peripheral devices without the use of special connections, such as null modem cables, between a client PC and the network device. In addition, the peripheral devices can be upgraded regardless of the operating system on the client device 15. In many implementations the techniques would not require any specialized knowledge of the upgrading process, allowing end users to perform the upgrades without assistance from a service representative. Also, the forgoing techniques can help reduce the amount of time required to upgrade embedded peripheral devices.

Various features of the system can be implemented in hardware, software, or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer, for configuring and operating the computer when the storage medium is read by the computer to perform the functions described above.

Other implementations are within the scope of the following claims.

What is claimed is:

1. A method comprising:
   receiving, at a network device, an upgrade package over a computer network sent from a client device, the upgrade package including a flash erase file containing null data and upgrade software;
   determining upgrade information for a peripheral device installed in the network device, the upgrade information comprising a type and version of the peripheral device and an upgrade process for the peripheral device;
   determining if the update package is compatible with the peripheral device based on the upgrade information; and
   automatically upgrading internal software of the peripheral device if the upgrade package is compatible with the peripheral device by appending contents of the flash erase file to a packet header, the packet header containing instructions for the peripheral device for overwriting contents of software in the peripheral device with the appended contents, and by transferring the packet header and the upgrade software to the peripheral device by a connection.

2. The method of claim 1 including recognizing the received package as an upgrade package based on information contained in the upgrade package.

3. The method of claim 1 including recognizing the received package based on a filename extension associated with the package.

4. The method of claim 1 wherein automatically upgrading the internal software includes:
   opening a communications channel to the peripheral device; and
   updating the peripheral device with contents of the upgrade package.

5. The method of claim 4 wherein upgrading the peripheral device includes:
   setting the peripheral device to an upgrade mode;
   parsing contents of the upgrade package into a format suitable for the peripheral device; and
   transferring the parsed contents to the peripheral device.

6. The method of claim 5 wherein setting the peripheral device to an upgrade mode includes issuing a command to the peripheral device.

7. The method of claim 1 including sending a message indicating success or failure of the upgrade to a source of the upgrade package.

8. A system comprising:
   a computer network;
   a network device coupled to the network; and
   a peripheral device installed within the network device;
   wherein the network device comprises a processor configured to:
   receive over the network an upgrade package that includes a flash erase file containing null data and upgrade software to update the peripheral device;
   determine upgrade information for a peripheral device installed in the network device, the upgrade information comprising a type and version of the peripheral device and an upgrade process for the peripheral device;
   determine if the update package is compatible with the peripheral device based on the upgrade information;
   append contents of the flash erase file to a packet header if the peripheral device is compatible with the upgrade information, the packet header containing instructions for the peripheral device to overwrite contents of software in the peripheral device with the appended contents; and
   transfer the packet header and the upgrade software to the peripheral device by a connection to automatically upgrade the peripheral device if the contents of the flash erase file are appended to the packet header.

9. The system of claim 8 wherein the processor is configured to upgrade internal software of the peripheral device with the package.

10. The system of claim 8 wherein the network device is configured to recognize the received package as an upgrade package based on information contained in the package.

11. The system of claim 8 wherein the network device is configured to recognize the received package as an upgrade package based on a filename extension associated with the package.

12. The system of claim 8 wherein the processor is configured to:
    open a communications channel to the peripheral device; and
    upgrade the peripheral device with contents of the upgrade package.

13. The system of claim 12 wherein the processor is configured to:
    set the peripheral device to an upgrade mode;
    parse contents of the upgrade package into a format suitable for the peripheral device; and
    transfer the parsed contents to the peripheral device.

14. The system of claim 13 wherein the processor is configured to set the peripheral device to the upgrade mode by issuing a command to the peripheral device.

15. The system of claim 8 wherein the processor is configured to send a message indicating success or failure of the upgrade to a source of the upgrade package.

16. An article comprising a computer-readable medium that stores computer-executable instructions for causing a computer system to:

recognize a received package as an upgrade package intended for a peripheral device installed in a network device, the upgrade package including a flash erase file containing null data and upgrade software;

determine upgrade information for a peripheral device installed in the network device, the upgrade information comprising a type and version of the peripheral device and an upgrade process for the peripheral device;

determine if the update package is compatible with the peripheral device based on the upgrade information;

append contents of the flash erase file to a packet header if the peripheral device is compatible with the upgrade information, the packet header containing instructions for the peripheral device to overwrite contents of software in the peripheral device with the appended contents; and transfer the packet header a:id the upgrade software to the peripheral device by a connection to automatically upgrade internal software in the peripheral device if the contents of the flash erase file rare appended to the packet header.

17. The article of claim 16 including instructions for causing the computer system to recognize the received package as an upgrade package based on information contained in the package.

18. The article of claim 16 including instructions for causing the computer system to:
    open a communications channel to the peripheral device; and
    upgrade the peripheral device with contents of the upgrade package.

19. The article of claim 18 including instructions for causing the computer system to:
    set the peripheral device to an upgrade mode;
    parse contents of the upgrade package into a format suitable for the peripheral device; and
    transfer the parsed contents to the peripheral device.

20. The article of claim 19 including instructions for causing the computer system to issue a command to the peripheral device in order to set the peripheral device to the upgrade mode.

21. The article of claim 16 including instructions for causing the computer system to send a message indicating success or failure of the upgrade.

22. An apparatus comprising:
    a port for coupling the apparatus to a network;
    a peripheral device installed in the apparatus; and
    a processor;
    wherein the processor is configured to:
        receive an upgrade package through the port, the upgrade package including a flash erase file containing null data and upgrade software;
        determine upgrade information for a peripheral device installed in the network device, the upgrade information comprising a type and version of the peripheral device and an upgrade process for :he peripheral device;
        determine if the update package is compatible with the peripheral device based on the upgrade information;
        append contents of the clash erase file to a packet header if the peripheral device is compatible with the upgrade information, the packet header containing instructions for the peripheral device to overwrite contents of software in the peripheral device with the appended contents; and
        transfer the packet header and the upgrade software to the peripheral device by a connection to automatically upgrade internal software of the peripheral device if the contents of the flash erase file are appended to the packet header.

23. The apparatus of claim 22 wherein the processor is configured to recognize the received package as an upgrade package based on information contained therein.

24. The apparatus of claim 23 wherein the processor is configured to recognize the received package based on a filename extension associated with the package.

25. The apparatus of claim 22 wherein the processor is configured to:
    set the peripheral device to an upgrade mode;
    parse contents of the upgrade package into a format suitable for the peripheral device; and
    transfer the parsed contents to the peripheral device.

26. The apparatus of claim 25 wherein the processor is configured to issue a command to cause the peripheral device to enter the upgrade mode.

27. The method of claim 1 wherein upgrading the internal software of the peripheral device occurs independently of a particular type of operating system on the client device.

* * * * *